United States Patent [19]
Sonnenberger

[11] 4,176,301
[45] Nov. 27, 1979

[54] CIRCUIT ARRANGEMENT FOR SUPPLYING A PROTECTION SIGNAL FOR A TELEVISION PICTURE DISPLAY TUBE

[75] Inventor: Paul Sonnenberger, Hamburg, Fed. Rep. of Germany

[73] Assignee: U.S. Philips Corporation, New York, N.Y.

[21] Appl. No.: 887,675

[22] Filed: Mar. 17, 1978

[30] Foreign Application Priority Data

Mar. 17, 1977 [DE] Fed. Rep. of Germany ....... 2711636

[51] Int. Cl.$^2$ ............................................. H01J 29/52
[52] U.S. Cl. .................................................. 315/384
[58] Field of Search ............... 315/381, 384, 385, 386; 358/220

[56] References Cited

U.S. PATENT DOCUMENTS 3,281,623  10/1966  Peterson et al. ..................... 315/384

Primary Examiner—Theodore M. Blum
Attorney, Agent, or Firm—Thomas A. Briody; William J. Streeter

[57] ABSTRACT

To obtain a protection signal, an additional blanking signal is generated during field blanking, this signal being cancelled before the end of the blanking period of the circuit functions in a normal manner. Consequently, checking the proper operation takes place instantaneously in every period and without an external capacitor. If field retrace pulses are absent the electron beam in the picture tube is permanently cut off.

12 Claims, 3 Drawing Figures

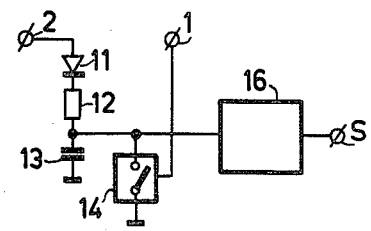
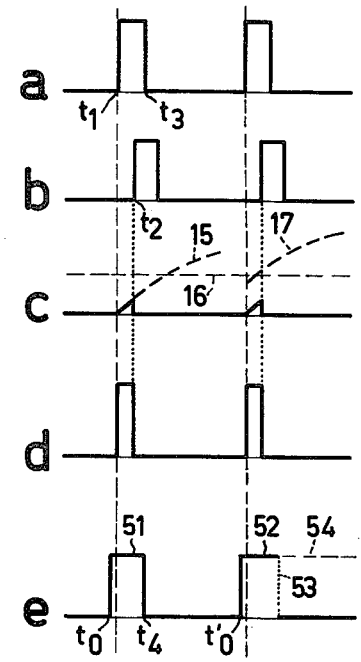
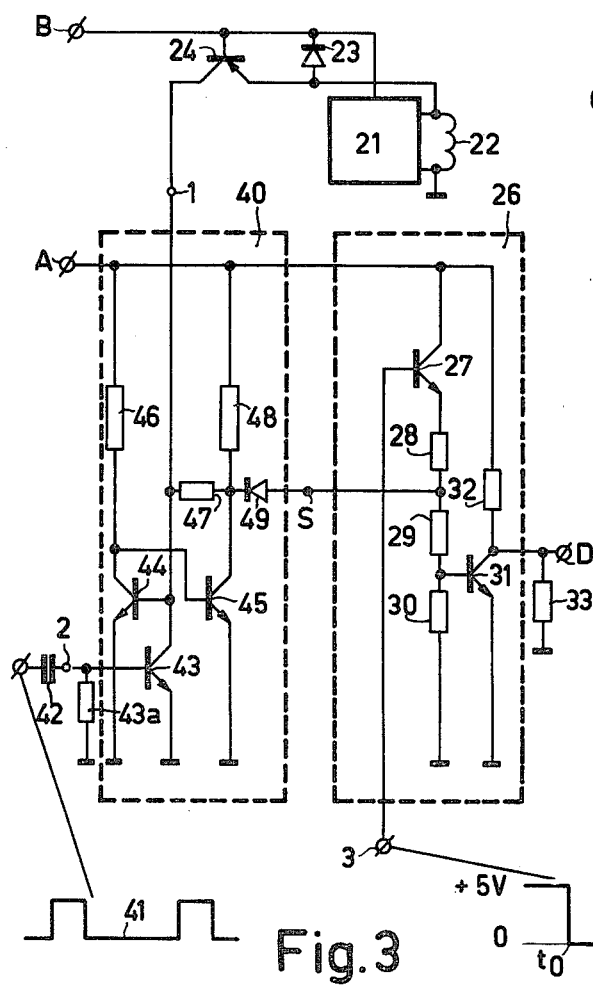

CIRCUIT ARRANGEMENT FOR SUPPLYING A PROTECTION SIGNAL FOR A TELEVISION PICTURE DISPLAY TUBE

The invention relates to a circuit arrangement for supplying a protection signal for a television display tube in the case of disturbed deflection, in which a periodic, pulse-shaped (first) signal having the deflection frequency is not produced.

In prior art television receiver circuits the retrace pulse occurring at the deflection coil is rectified and a D.C. voltage is derived therefrom which eliminates a picture display tube inhibiting bias voltage as long as the deflection operates properly. To obtain this D.C. voltage a capacitor is required having a discharge time constant which is great relative to the period of the charge pulses and which amounts to at least 100 ms at the field deflection. Consequently, such a circuit is not suitable for implementation in integrated circuit technology where large capacitances cannot be integrated, and should therefore be connected externally. This requires at least one connecting terminal of which there are, however, only a very limited number.

It is an object of the invention to implement a switching arrangement of the above-defined type, so that a high-value capacitor is not required, so that the circuit can be implemented in integrated circuit technology without difficulty. To achieve this the circuit arrangement according to the invention is characterized by a periodic second signal of the same frequency and independent relative to the first signal, which second creates a switching state which prepares the generation of the protection signal, this state being cancelled during or prior to the occurrence of the next interval of the first signal.

So in practice the protection signal for cutting off the electron stream of the picture tube is prepared in each cycle of the first signal to be checked, but is cancelled again during or prior to the immediately following cycle if the normal function occurs. This results in a very rapid action which is not delayed by large time constants.

The protection signal can be obtained by charging a capacitor whose voltage exceeds a threshold value when the first signal is not produced in a normal manner. The time constant of the capacitor charge can be very small, so small that the threshold value is already exceeded in the second charging interval after the absence of a discharge.

Whether the protection signal is produced or not produced can already be determined within one cycle when an edge in the second signal adjusts a bi-stable switching stage to a second state and when an edge occurring somewhat later in the first signal resets the switching stage, the switching stage supplying the protection signal in the second state, if resetting does not occur.

In a switching arrangement comprising a blanking stage to which a blanking signal is applied during the retrace of the field deflection, and which applies a signal to the display tube for cutting off the electron beam therein, switching over and resetting of the bistable switching stage is preferably effected within the blanking period, and in the second state of the bistable switching stage the protection signal is applied to the picture display tube independent of the retrace blanking signal. This results in that on the one hand the preparation and resetting of the protection signal during normal operation has no effect and that, on the other hand, the blanking stage, when it supplies the protection signal, is independent of the normal control.

Pulse-shaped signals, whose edges may be slightly delayed relative to one another are preferably used for the control. Such slight delays can also be obtained in integrated circuit technology. Otherwise, a switching arrangement according to the invention is not coupled to the switching instants required for normal operation, so that close tolerances need not be observed.

The invention will now be explained, by way of non-limitative example, with reference to the accompanying Figures in which FIG. 1 is a circuit diagram of the invention, FIG. 2 shows signals occurring in the time and FIG. 3 shows a more detailed switching arrangement with field blanking stages for a television receiver.

In FIG. 1 a signal at a terminal 2, consisting for example of the positive pulses shown in FIG. 2a, is applied to a capacitor 13 via a diode 11 and a resistor 12. A discharge switch 14, which is closed in the rhythm of a first signal at a terminal 1, is arranged in parallel with capacitor 13, as shown in FIG. 2b. Consequently, as shown in FIG. 2c, the capacitor is charged from the instant $t_1$ at which the leading edge of the second signal, that is to say the signal at terminal 2, is produced and rapidly discharged by means of switch 14 at the instant $t_2$ of the leading edge of the first signal. Capacitor 13 has a charge curve 15 as shown by means of dashed lines in FIG. 2c, the time constant of which is approximately double the duration of the pulses shown in FIGS. 2a and 2b, that is to say approximately one third of the cycle of these pulses.

The voltage of capacitor 13 is supplied to a threshold value device 16 which supplies a protection signal at its output terminal S if a given threshold value is exceeded, as shown in FIG. 2c by means of dashed line 16. The drawing shows that during normal operation the charge curve 15 does not attain the threshold value 16 because capacitor 13 is discharged already at instant $t_2$. If, however, this discharge is not effected for some reason capacitor 13 is charged during the pulse duration, extending from $t_1$ to $t_3$, of the signal at the terminal 1. The discharge time constant of the capacitor 13 is very large relative to the pulse period so that the voltage obtained in such a case is still present at the beginning of the next pulse and charging continues in accordance with curve 17—which corresponds to a curve 15 which has a new starting instant in the drawing so that the threshold value 16 is rapidly exceeded and the protection signal is delivered.

In FIG. 3 reference numeral 21 denotes the field deflection output stage of a television receiver which supplies a sawtooth current to the field deflection coil 22 for the vertical deflection, the lower end of which is connected to ground. Stage 21 is fed by a battery B which supplies a positive voltage of, for example, 20 volts relative to ground. The end of coil 22 remote from chassis (ground) and at which a positive voltage pulse is produced during the retrace period of the deflection is connected, in known manner, via a diode 23 to battery B, so that the retrace pulse is limited to approximately the voltage of the battery B and energy is fed back to the battery.

Within the frame work of the invention this voltage pulse occurring at diode 23 is applied between the emitter and the base of a pnp transistor 24 so that a collector current value pulse of equal shape is produced which supplies the first signal to terminal 1.

The receiver comprises a blanking stage 26 supplying a signal at an output terminal D during the retrace period of the field deflection so that the electron beam in the picture display tube is blanked in known manner, the signal at terminal D being, for example, supplied to a suitable electrode of the tube. Stage 26 is fed relative to ground from a battery A of, for example, +12 V and comprises a npn transistor 27, the collector of which is connected to battery A, while the emitter branch comprises the series arrangement of resistors 28, 29 and 30 of approximately 3.9, 2.2 and 4.7 kΩ respectively. The tap between resistors 29 and 30 is connected to the base of a non transistor 31 the emitter of which is earthed and the collector of which is connected via a resistor 32 of high value or an essentially still more high-omic current source circuit to the supply rail A.

Usually transistor 27 is made conductive during the trace period of the deflection by a blanking signal supplied from terminal 3, which is connected to the base, this blanking signal being at +5 volts during the trace period and at 0 volt during the retrace period. During the trace period the emitter of transistor 27 is at approximately 3.4 volts and the base of transistor 31 at a positive potential of approximately 0.7 volts, so that the collector conducts and the collector voltage is low. On the contrary, the base of transistor 27 is cut-off during the retrace period so that the emitter of transistor 27 and the base of transistor 31 assume earth potential and the collector voltage of transistor 31 increases to a value which is also determined by load resistor 33, connected to terminal D. This produces a positive blanking signal which cuts off the picture tube beam current in each field cycle during the retrace period.

In accordance with the invention the protection signal present at terminal S is applied in blanking stage 26 to the junction of resistors 28 and 29, this protection signal being supplied by a bi-stable switching stage 40. The second signal, which substantially corresponds to FIG. 2a is applied to terminal 2 of stage 40. As this signal preferably controls by means of its leading edge it may be considerably shorter and may have been derived, for example, from a square wave signal 41 by means of a differentiating network consisting of a series capacitor 42 and a parallel resistor 43a and supplying brief positive-going pulses during the occurrence of the rising edge of the second signal. These pulses drive the base of a npn transistor 43 the collector of which is connected to terminal 1, the first signal being applied to this terminal from transistor 24.

Bi-stable switching stage 40 comprises two npn transistors 44 and 45 whose emitters are connected to earth while the base of transistor 45 is connected to the collector of transistor 44 and, in addition, via an approximately 3.3 kΩ load resistor 46 to supply source A. The base of transistor 44 is connected to the collector of transistor 43 and, consequently, to the input of the first signal and, in addition, via an approximately 3.3 kΩ resistor 47 to the collector of transistor 45 which is connected via a load resistor 48 to supply source A and, furthermore, to the cathode of a diode 49, the cathode of which forms the terminal S from which the protection signal for the blanking stage 26 is derived.

In the quiescent state during the field trace period transistors 43 and 45 carry no current. Current flows via resistors 48 and 47 to the base of transistor 44 and the collector voltage thereof is so low, owing to the voltage drop at resistor 46, that transistor 45 is kept in the cut-off state. So, a given positive voltage is produced at the cathode of diode 49 which is determined by resistors 47 and 48 and which is higher than the positive voltage occurring during the field trace period at the junction between resistors 28 and 29. So diode 49 is cut off.

As soon as the second signal drives transistor 43 for a short period of time the voltage at the base of transistor 44 decreases to below the limit value of approximately 0.7 volt, so that its collector current becomes zero. The collector voltage increases and current flows via resistor 46 to the base of transistor 45, which becomes conductive so that its collector-emitter voltage assumes a very low value. The voltage at the cathode of diode 49 is then lower than the value present between resistors 28 and 29 when diode 49 is cut-off. Consequently, diode 49 becomes conductive and the voltage at terminal S is reduced to the low value of the collector-emitter voltage of transistor 45, causing transistor 31 to be cut off. A blanking signal is then produced at the output terminal D, connected to the collector of transistor 31, in the same manner as effected by the negative-going portion of the signal at terminal 3. However, the protection signal supplied via diode 49 produces the signal at terminal D, independently of the potential of the signal at terminal 3.

When the deflection operates properly and a positive pulse occurs at deflection coil 22 during the retrace period, so prior to the next trace period, transistor 24 becomes conductive and the first signal is applied from the collector via terminal 1 to the base of transistor 44 which consequently becomes conductive so that the collector-emitter voltage thereof assumes a very low value and transistor 45 is cut-off. This reinstates the above-mentioned normal state of bi-stable stage 40, diode 49 is cut-off and the drive of the signal at terminal D is effected exclusively by the blanking signal at terminal 3.

As a rule the second signal, which produces the protection signal S will occur at instant $t_1$ (see FIG. 2a) which instant is slightly delayed relative to the instant $t_0$ of the leading edge of the blanking pulse (see FIG. 2e). During the retrace period located between the instant $t_0$ and $t_4$ of the blanking signal the first signal, which approximately corresponds to FIG. 2b, is then obtained from transistor 24. At the instant $t_2$ of the leading edge the protection signal S is cancelled again. From FIG. 2 it appears that this signal remains present only between instants $t_1$ and $t_2$, and has no effect, since, owing to the blanking signal at terminal 3 of transistor 27 the branch containing the resistors 28, 29 and 30 is already currentless and transistor 31 is cut-off, so that a signal in accordance with the first pulse 51, shown in FIG. 2e, is produced at output terminal D between instants $t_0$ and $t_4$. The trace period with normal signal transmission, located between instant $t_4$ and the instant $t'_0$ of the next blanking pulse, is not affected.

If, however, the deflection does not function properly and the retrace pulse is not produced via transistor 24, the bistable switching stage 40 remains in the state in which a continuous protection signal is supplied at terminal S independent of the drive of transistor 27; transistor 31 is then permanently cut-off and immediately after the disturbance a blocking signal 54 is produced at a second pulse 52 (see FIG. 2e), instead of an edge 53 releasing the picture tube current. If the function of the deflection becomes normal again this blocking signal is immediately cancelled.

The driving edge of the pulse-shaped signal applied to terminal 2 can be formed by the leading edge of the field synchronization pulse. The driving leading edge of this signal may be delayed for a fraction, for example 5 to 25%, of the retrace period relative to the leading edge of the blanking signal at the terminal 3. In a corresponding manner the driving edge of the reset pulse supplied from transistor 24, this edge effecting resetting of bi-stable switching stage 40, may be delayed for, for example 5 to 25% of the retrace period. Such a delay can also be effected by means of a clock circuit which for example with the frequency of the horizontal deflection shifts the driving edge for the desired amount before being applied to switching stage 40.

The resetting signal applied to terminal 1 can alternatively be derived from another amplitude value of a free, non-limited retrace pulse which may then be delayed in accordance with a substantially sinusoidal variation of the retrace voltage.

What is claimed is:

1. A circuit arrangement for supplying a protection signal to a display tube in the event of a disturbed deflection during which a periodic pulse shaped first signal having the deflection frequency is not produced, said circuit comprising a capacitor coupled to receive a periodic second signal of the same frequency and independent relative to said first signal, said second signal initiating charging said capacitor to provide for the generation of said protection signal, a switch means coupled to said capacitor having a control input means for receiving said first signal and for discharging said capacitor upon receiving said first signal, and a threshold means coupled to said capacitor for providing said protection signal when the capacitor voltage exceeds a threshold voltage.

2. A circuit arrangement for supplying a protection signal to a display tube in the event of a disturbed deflection during which a periodic pulse shaped first signal is not produced, said circuit comprising a bistable switching stage having input means for receiving a periodic second signal of the same frequency and independent relative to said first signal and for setting said stage to initiate the generation of a protection signal upon receiving a driving edge of said second signal, input means for receiving said first signal and for resetting said stage to cancel said protection signal upon receiving an edge of said first signal occurring later than said second signal edge, and output means for supplying said protection signal if said resetting does not occur.

3. A circuit arrangement as claimed in claim 2, further comprising a blanking stage having an input coupled to said switching stage output means, an input means coupled to receive a blanking signal during the retrace of the field deflection, and an output means for applying a signal to the display tube for cutting off the electron beam therein, setting and resetting of the bi-stable switching stage being effected within the blanking period, and in the set state of the bi-stable switching stage the protection signal being applied to the picture display tube independent of the retrace blanking signal.

4. A circuit arrangement as claimed in claim 3, wherein said blanking stage comprises an emitter follower stage, the control signal for retrace blanking being applied to the base of said emitter-follower stage, the blanking signal being applied to the emitter resistance of this stage.

5. A circuit arrangement as claimed in claim 3, wherein the driving edge of the second signal comprises the leading edge of the field synchronization pulse.

6. A circuit arrangement as claimed in claim 3, wherein the driving leading edge of the second signal is delayed for a fraction, of the retrace period relative to the leading edge of the blanking signal.

7. A circuit arrangement as claimed in claim 6, wherein said delay comprises five to twenty-five percent of the retrace period.

8. A circuit arrangement as claimed in claim 3, wherein the first signal is the retrace pulse of the deflection.

9. A circuit arrangement as claimed in claim 8, wherein resetting the retrace pulse is effected by the leading edge of the first signal.

10. A circuit arrangement as claimed in claim 9, wherein said leading edge is delayed for from five to twenty-five percent of the retrace period.

11. A circuit arrangement as claimed in claim 8, wherein resetting is effected by a signal derived from the maximum amplitude of the retrace pulse.

12. A circuit arrangement as claimed in claim 11, further comprising an amplitude limiter having an input means for receiving the retrace pulse and an output means for supplying the resetting signal.

* * * * *